United States Patent Office 2,826,617
Patented Mar. 11, 1958

2,826,617

MANUFACTURE OF TRICHLORO- AND TETRACHLOROBENZENES

Horace E. Redman and Paul E. Weimer, Baton Rouge, La., assignors to Ethyl Corporation, New York, N. Y., a corporation of Delaware No Drawing. Application August 5, 1954
Serial No. 448,161

1 Claim. (Cl. 260—650)

This invention relates to the production of chlorinated benzenes and, more particularly, to a new and improved method for the manufacture of 1,2,4-trichlorobenzene and also the formation of 1,2,4,5-tetrachlorobenzene from the trichlorobenzene so formed.

As is well known, trichlorobenzene has great utility as a solvent, a pesticide, a scavenger for leaded fuels, and the like. 1,2,4-trichlorobenzene is of peculiar importance in that it is the only isomer from which the valuable 1,2,4,5-tetrachlorobenzene can be formed and, as such, forms a raw material for the manufacture of 2,4,5-trichlorophenoxy acetic acid. The latter compound and derivatives thereof are potent herbicides and are formed from 2,4,5-trichlorophenol, obtained by hydrolysis of 1,2,4,5-tetrachlorobenzene.

Trichlorobenzene is now manufactured either by the chlorination of benzene or by dehydrochlorination of 1,2,3,4,5,6 - hexachlorocyclohexane (benzene hexachloride). In either process, a mixture of trichlorobenzene isomers is obtained, which mixture is very difficult to separate into its component parts. Thus, in the manufacture of 1,2,4,5-tetrachlorobenzene, it is normally most convenient and economical to chlorinate the entire trichlorobenzene mixture and separate the desired 1,2,4,5-tetrachlorobenzene by crystallization from the "waste" tetrachlorobenzene isomers. The lattter by-products constitute a relatively large fraction of the reaction product since an appreciable quantity of the feed trichlorobenzene consists of the 1,2,3- and 1,3,5-trichlorobenzene isomers. These isomers do not form the desired 1,2,4,5-tetrachlorobenzene, as noted above. In addition, about a third of the 1,2,4-trichlorobenzene also forms waste tetrachlorobenzene isomers. In addition to the loss due to chlorination, a quantity of the desired 1,2,4,5-tetrachlorobenzene forms a eutectic mixture with the waste isomers and is lost in the mother liquor formed in the crystallization operation.

It is, accordingly, an object of this invention to provide an improved process for the manufacture of 1,2,4-trichlorobenzene. Another object of this invention is to provide a process in which 1,2,4-trichlorobenzene can be manufactured from tetrachlorobenzene and particularly the waste tetrachlorobenzene isomers normally lost in the manufacture of 1,2,4,5-tetrachlorobenzene. Still another object is to provide a process of the above type which can be combined with a chlorination operation to produce essentially quantitative yields of 1,2,4,5-tetrachlorobenzene from any trichlorobenzene feed material. Other objects and advantages of this invention will be apparent from the following description and appended claims.

It has now been found that a trichlorobenzene product having an exceptionally high and unexpected concentration of the valuable 1,2,4-trichlorobenzene isomer can be produced from tetrachlorobenzene by reaction of tetrachlorobenzenes with hydrogen in the presence of certain catalysts. The process can be employed using any of the tetrachlorobenzene isomers, but is particularly useful in converting the waste isomers, obtained in the production of the 1,2,4,5-tetrachlorobenzene, to the valuable 1,2,4-trichlorobenzene. These isomers, i. e. the 1,2,3,4- and the 1,2,3,5-tetrachlorobenzene, both produce unexpectedly large quantities of the desired 1,2,4-trichlorobenzene isomer when treated in accordance with this invention. In fact, no 1,2,4-isomer would normally be expected upon hydrogenolysis of the 1,2,3,5-tetrachlorobenzene isomer. Yet, appreciable quantities are actually obtained.

All or a large fraction of the tetrachlorobenzene feed can be converted to the desired trichlorobenzene. In practice, it is preferred to convert only a fraction of the feed per pass through the reactor, preferably separating the unconverted fraction for recycle, such as with an additional fresh tetrachlorobenzene feed. In most instances, some dichlorobenzenes and/or monochlorobenzenes are formed along with the desired trichlorobenzene. This product can be used as such or the latter by-products can be chlorinated to produce additional trichlorobenzenes, particularly the 1,2,4-trichlorobenzene isomer.

The hydrogenolysis catalysts useful in accordance with the present invention are metals of groups I, VI and VIII of the periodic table. Also, the salts or oxides of these metals, or any other metal, including oxides and salts thereof, which will replace one of the chlorine atoms from tetrachlorobenzene with a hydrogen atom. Typical examples of these metals which are effective for this purpose are platinum, palladium, molybdenum, copper, silver, chromium and nickel. Also, compounds such as copper chromite are extremely effective. It is preferred to utilize the catalysts on a carrier, such as activated carbon, silica gel, kieselguhr, alumina, and natural clays which are known catalyst carriers.

The temperature for the conversion of the tetrachlorobenzenes to trichlorobenzene is not critical, although materially improved results are obtained at temperatures above about 250° C. and preferably above about 350° C. With most of the catalysts, the reaction is very active at temperatures around 400° C. The upper temperature limit is not important, although excessively high temperatures tend to crack the polychlorobenzenes. At temperatures above about 300° C., the reaction is generally carried out in the vapor state, which conditions have been found to give better yields than liquid phase operation.

The pressure of the hydrogenolysis operation is not particularly critical. Normally, it is preferred to employ atmospheric pressure or sub-atmospheric pressure. Super atmospheric pressure can be used, although there is a tendency to liquefy the reactants, giving inferior results under many circumstances.

The process can be carried out using either batch or continuous procedures. However, since vapor phase operation is desirable and, in view of the well known advantages inherent in a continuous process, the latter is generally preferred.

In general, the hydrogen is fed to the hydrogenolysis operation in a ratio of between about 0.5:1 to about 1.5:1, although stoichiometric quantities are preferred, i. e. one mole of hydrogen per mole of tetrachlorobenzene. Higher concentrations of hydrogen can be employed, although these excess quantities tend to result in the formation of a product containing compounds having an excessively low chlorine content (less than 3 chlorine atoms). Lower concentrations of hydrogen result in the necessity of recycling excessive quantities of the tetrachlorobenzene through the hydrogenolysis operation.

The following examples are given to more fully illustrate the benefits of the present invention, but are not intended to limit the same. In each of these examples, the quantities are only for a single pass through the reactor and it should be understood that it is preferred to strip off the trichlorobenzenes and lower chlorinated benzene and recycle the unreacted fraction for further reaction. Using this procedure, essentially complete conversion of the feed to trichlorobenzenes can be obtained. The quantities given are in parts by weight.

Example I

Tetrachlorobenzene (2004 parts) was passed through a reactor maintained at about 410° C. and containing 284 parts of a catalyst consisting of 0.5 percent of palladium on alumina. Hydrogen was continuously fed to the reactor, the mole ratio of hydrogen to tetrachlorobenzene being maintained at about 0.75. The reaction was carried out for 14 hours and the hydrogen conversion was 85.7 percent. The tetrachlorobenzene feed had the following composition in parts by weight:

| | |
|---|---|
| 1,2,3-trichlorobenzene | 0.3 |
| 1,2,4-trichlorobenzene | 1.3 |
| 1,2,3,4-tetrachlorobenzene | 65.9 |
| 1,2,3,5-tetrachlorobenzene | 15.8 |
| 1,2,4,5-tetrachlorobenzene | 7.6 |
| Pentachlorobenzene | 8.9 |

The product of the reaction (1,817 parts) had the following composition:

| | |
|---|---|
| Benzene | 1.4 |
| Monochlorobenzene | 1.1 |
| 1,2-dichlorobenzene | 3.3 |
| 1,3-dichlorobenzene | 0.9 |
| 1,4-dichlorobenzene | 0.4 |
| 1,2,3-trichlorobenzene | 9.1 |
| 1,2,4-trichlorobenzene | 6.6 |
| 1,2,3,4-tetrachlorobenzene | 49.8 |
| 1,2,3,5-tetrachlorobenzene | 14.6 |
| 1,2,4,5-tetrachlorobenzene | 6.7 |
| Pentachlorobenzene | 5.9 |

It can be seen that about 25 percent of the higher chlorination fraction of the feed is converted to trichlorobenzenes or lower chlorinated benzenes. The concentration of the 1,2,4-trichlorobenzene has been materially increased, over 500 percent increase. In addition, a large quantity of the valuable 1,2,4-trichlorobenzene can be produced by chlorination of the dichlorobenzenes and other lower chlorinated benzene products.

Example II

Example I was repeated except that the temperature was maintained at 300° C. and the reaction period was 37 hours. Two hundred sixty-seven (267) parts of catalyst were employed and 5,132 parts of tetrachlorobenzene feed was passed into the reactor. The average conversion was 50.6 percent based upon the hydrogen feed. The hydrogen:tetrachlorobenzene feed ratio was 1:1. The feed tetrachlorobenzene in this example had the following composition in percent by weight:

| | |
|---|---|
| 1,2,3-trichlorobenzene | 0.2 |
| 1,2,4-trichlorobenzene | 17.9 |
| 1,2,3,4-tetrachlorobenzene | 53.8 |
| 1,2,3,5-tetrachlorobenzene | 2.0 |
| 1,2,4,5-tetrachlorobenzene | 6.9 |
| Pentachlorobenzene | 17.9 |
| Hexachlorobenzene | 1.2 |

The product (4576 parts) had the following composition in percent by weight:

| | |
|---|---|
| Monochlorobenzene | 0.6 |
| 1,2-dichlorobenzene | 4.0 |
| 1,3-dichlorobenzene | 1.0 |
| 1,4-dichlorobenzene | 2.3 |
| 1,2,3-trichlorobenzene | 11.0 |
| 1,2,4-trichlorobenzene | 24.9 |
| 1,2,3,4-tetrachlorobenzene | 40.1 |
| 1,2,3,5-tetrachlorobenzene | 3.4 |
| 1,2,4,5-tetrachlorobenzene | 6.9 |
| Pentachlorobenzene | 5.5 |
| Hexachlorobenzene | 0.2 |

In this example, over 30 percent of the higher chlorinated fraction was converted in a single pass through the reactor to trichlorobenzenes and lower chlorinated benzenes. The 1,2,4-trichlorobenzene content increased substantially and, in addition, a large proportion of the dichlorobenzene produced can readily be chlorinated to the valuable 1,2,4-trichlorobenzene by known means. It should be particularly noted that essentially all of the 1,2,4-trichlorobenzene increase in the product resulted from a decrease in the waste 1,2,3,4-tetrachlorobenzene isomer and not from the valuable 1,2,4,5-tetrachlorobenzene isomer. While the 1,2,3,5-tetrachlorobenzene isomer content increased slightly, this resulted from the hydrogenolysis of the higher chlorinated benzenes, i. e. the pentachlorobenzene and the hexachlorobenzene. This isomer is also converted to the valuable 1,2,4-trichlorobenzene isomer under the conditions of the reaction.

Example III

Example II was repeated except that the reaction temperature was maintained at 400° C. for 39.5 hours. In this example 275 parts of a catalyst containing 0.5 percent platinum on alumina was employed. 5,024 parts of tetrachlorobenzene feed having the same composition as employed in Example II was fed to the reactor in a hydrogen to tetrachlorobenzene feed ratio of 1:1. 75 percent conversion was obtained, based upon the hydrogen feed. 4,386 parts of product were obtained having a generally similar product distribution.

The hydrogenolysis process of this invention has particularly desirable application when combined with a chlorination operation. Because of the preferential production of the 1,2,4-trichlorobenzene isomer from all of the tetrachlorobenzene isomers, essentially quantitative yields of the 1,2,4,5-tetrachlorobenzene isomer can be produced.

In a combined process, benzene or lower chlorinated benzenes are fed to a chlorinator. The reaction product is thereafter crystallized to remove the valuable 1,2,4,5-tetrachlorobenzene. The mother liquor so formed is then passed with hydrogen through a hydrogenolysis reactor to convert the waste tetra-isomers to fresh quantities of 1,2,4-trichlorobenzene. The latter is then fed to the chlorinator, along with additional fresh benzene feed.

It is preferred to carry out the chlorination with relatively low concentrations of chlorine, and recycle the unreacted trichlorobenzene through the chlorinator. The recycle of lower chlorinated material (trichlorobenzene) to higher chlorinated material (tetrachlorobenzene) can range between about 0.5:1 to 15:1 and preferably between about 1:1 to 3:1. In general, higher recycle ratios improve both the chlorine and organic feed utilization in producing 1,2,4,5-tetrachlorobenzene. However, recycle ratios above about 15:1 do not appreciably improve the economical utilization of the feed materials of the process. Lower recycle ratios can be employed but only at the expense of the economical utilization of chlorine and organic feed.

The temperature of the chlorination step can vary between 10°–150° C. although a temperature between about 75°–85° C. is preferred. In general, higher temperatures merely increase the reaction rate of the process. Lower temperatures of chlorination can also be employed, but generally it is desired, in a continuous process, to maintain the temperature sufficiently high to prevent crystallization within the chlorinator.

Various chlorination catalysts are suitable for use in the process. Typical examples are ferric chloride, aluminum chloride, gallium chloride, other group III halides, and metallic iron.

The temperature of crystallization of the 1,2,4,5-tetrachlorobenzene should be between 15°–60° C., depending upon the final solidification temperature of the crystallizer solution. In general, it is preferred to employ a crystallizer temperature between about 20°–35° C.

Separation of the unreacted trichlorobenzene fraction, as by fractionation, from the higher boiling fraction of the reactor solution should be essentially complete for optimum conditions, although some quantities of lower chlorinated compounds can be tolerated in the crystallizer feed material. In general, the concentration of trichlorobenzene and other lower chlorinated benzene compounds should not exceed 20 percent by weight of the crystallizer feed solution, and preferably less than 2–5 percent.

*Example IV*

This example illustrates a process for manufacturing 1,2,4,5-tetrachlorobenzene from a feed containing essentially trichlorobenzenes, in which the by-product tetrachlorobenzenes are hydrogenated to trichlorobenzenes and thereafter further chlorinated to produce essentially quantitative yields of 1,2,4,5-tetrachlorobenzene.

The chlorobenzene feed contains 77.8 percent 1,2,4-trichlorobenzene, 12.9 percent other trichlorobenzenes and the remainder dichlorobenzenes. The chlorobenzene feed is fed to a one stage pot type continuous reactor maintained at 80° C. at the rate of 350 parts by weight/hour and chlorine is concurrently fed at the rate of 125 parts by weight/hour. Iron nails are employed as a catalyst. The average residence time in the reactor is 87 minutes. The product from this reactor is passed to a fractionator having an overhead temperature of 215° C. and the light fraction, i. e. trichlorobenzene is recycled to the chlorinator. The bottoms from the fractionator, containing primarily tetrachlorobenzenes, is passed into a stirred crystallizer maintained at 50° C. wherein 1,2,4,5-tetrachlorobenzene is crystallized from the liquid medium. The crystallizer feed (447 parts) contains 56.1 percent 1,2,4,5-tetrachlorobenzene, 38.7 percent other tetrachlorobenzenes, the remainder being primarily pentachlorobenzene and hexachlorobenzene. The crystallized 1,2,4,5-tetrachlorobenzene product (267 parts) has a purity of 93 percent. The mother liquor from this crystallization is essentially other tetrachlorobenzenes and contains only 6 percent of the desired 1,2,4,5-isomer. This material (180 parts) is passed into a hydrogenolysis reactor along with equal moles of hydrogen. The hydrogenolysis reactor, maintained at 410° C., contains 150 parts of catalyst consisting of 0.5 percent of palladium on alumina. The total reaction time in the hydrogenolysis reactor is 14 hours and the hydrogen conversion is 86 percent. The product from the latter reactor is passed into a fractionating column wherein the trichlorobenznes and lower chlorinated benzenes are separated from the remaining product. 76 parts per hour of overhead are recovered containing 76 percent trichlorobenzenes, 18 percent dichlorobenzenes, 3 percent monochlorobenzene, and 3 percent benzene. This overhead, after separation of small quantities of unreacted hydrogen is recycled to the chlorinator reactor, along with the overhead of trichlorobenzene, noted above, and the fresh chlorinated benzene feed. The bottoms from the fractionator consisting primarily of tetrachlorobenzenes is recycled to the hydrogenolysis reactor along with the feed from the crystallizer.

*Example V*

Example IV is repeated except that the catalyst is 0.5 percent platinum on alumina and the reaction temperature is maintained at about 400° C. Similar results are obtained.

As is believed apparent from the foregoing, the present invention provides an improved process for the manufacture of the valuable 1,2,4-trichlorobenzene from relatively inexpensive tetrachlorobenzenes and particularly waste tetrachlorobenzene formed in the crystallization of 1,2,4,5-tetrachlorobenzene. Due to the exceptional and unexpectedly high yields of the valuable 1,2,4-trichlorobenzene isomer from all of the tetrachlorobenzene isomers, this process is extremely efficient and economical and lends itself to combination with a chlorination step to produce the valuable 1,2,4,5-tetrachlorobenzene. As pointed out above with reference to the production of 1,2,4,5-tetrachlorobenzene, the latter compound is crystallized from the chlorination product and the mother liquor, consisting of all of the tetrachlorobenzenes, is further treated with hydrogen to produce large quantities of 1,2,4-trichlorobenzene. The latter compound can thereafter be further chlorinated to produce the desired tetrachlorobenzene product. Thus, the present invention provides a means for obtaining quantitative yields of 1,2,4,5-tetrachlorobenzene from any and all of the trichlorobenzenes or lower chlorinated benzene compounds.

We claim:

A process for recovering desirable chlorinated benzenes from a waste tetrachlorobenzene chlorination by-product mixture containing a large proportion of pentachlorobenzene, said process comprising reducing these materials to lower chlorinated benzenes by reacting the mixture with hydrogen at a temperature above about 250° C. while in contact with a metal hydrogenation catalyst selected from the group consisting of platinum, palladium, molybdenum, copper, silver, chromium and nickel, whereby the pentachlorobenzene is reduced by an amount greater than the net reduction of the tetrachlorobenzenes.

References Cited in the file of this patent

UNITED STATES PATENTS

| | | |
|---|---|---|
| 1,934,675 | Mills | Nov. 7, 1933 |
| 2,025,032 | Arnold et al. | Dec. 24, 1935 |
| 2,560,950 | Head | July 17, 1951 |
| 2,725,405 | Britton et al. | Nov. 29, 1955 |
| 2,726,271 | Troyan et al. | Dec. 6, 1955 |

OTHER REFERENCES

Busch et al.: "Ber. der deut. Chem. Gesell.," vol. 62B, pages 2612–20 (1929).